(12) United States Patent
Keller et al.

(10) Patent No.: US 6,872,480 B2
(45) Date of Patent: Mar. 29, 2005

(54) METHOD FOR OPERATING A FUEL CELL BATTERY

(75) Inventors: Martin Keller, Winterthur (CH); Andreas Ruegge, Winterthur (CH)

(73) Assignee: Sulzer Hexis AG, Winterthur (CH)

( * ) Notice: Subject to any disclaimer, the term of this patent is extended or adjusted under 35 U.S.C. 154(b) by 422 days.

(21) Appl. No.: 09/960,530

(22) Filed: Sep. 21, 2001

(65) Prior Publication Data

US 2002/0037445 A1 Mar. 28, 2002

(30) Foreign Application Priority Data

Sep. 25, 2000 (EP) .............................................. 00810876

(51) Int. Cl.[7] .............................. H01M 8/04; H01M 8/12
(52) U.S. Cl. ............................. 429/13; 429/22; 429/23; 429/24
(58) Field of Search .............................. 429/13, 22, 23, 429/24

(56) References Cited

U.S. PATENT DOCUMENTS 5,154,599 A * 10/1992 Wunning .................... 431/215
6,376,110 B1 * 4/2002 Koschany ..................... 429/13
6,386,862 B1 * 5/2002 Fujita et al. ................. 431/170
6,436,561 B1 * 8/2002 Hart-Predmore et al. ..... 429/12

FOREIGN PATENT DOCUMENTS

| EP | 1069636 A2 | 1/2001 |
| JP | 01031353 | 1/1989 |
| JP | 04087263 | 3/1992 |
| WO | 98/45890 | * 10/1998 |

* cited by examiner

Primary Examiner—Jonathan Crepeau
(74) Attorney, Agent, or Firm—Townsend and Townsend and Crew LLP

(57) ABSTRACT

The method for operating a fuel cell battery (1) comprises an analysis of an integrity state of the battery. This integrity state is determined by means of measurement of operating parameters and a programmed evaluation of the measurement data. The battery is controlled for the purpose of reliable operation in such a manner that the maximum electrical output power is subjected to a limitation which is dependent on the integrity state or an interruption of the operation is initiated. The integrity state can be characterized by at least two parameters, in particular a parameter pair $C_j$, $d_j$. From a relationship which contains the parameters an internal electrical resistance ($R_i$) of the battery can be calculated on the one hand and a statement on the quality of the battery can be derived on the other hand.

10 Claims, 3 Drawing Sheets

$R_i = -\Delta U/\Delta I$ (1)

Fig. 4  $y = c_j x^{d_j}$  (III)    $x = Q_F / n$  (III')

$y = A_E R_i / n$  (III'')

Figure 1:
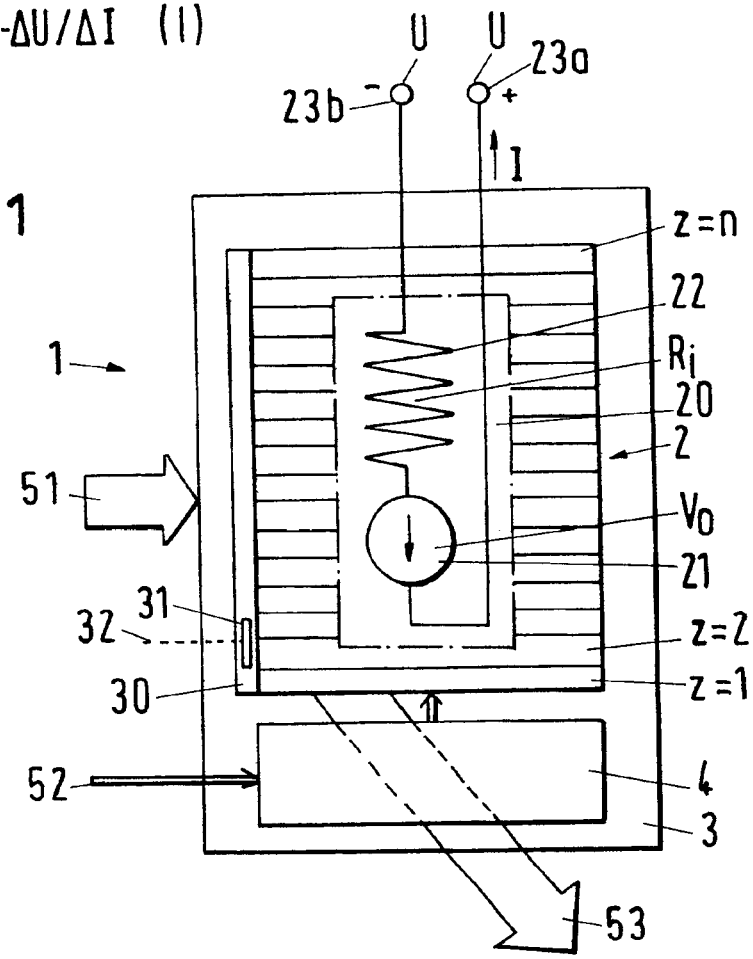

|  | $c_j =$ | $-d_j =$ |
|---|---|---|
| $j = 1$ | 184.1 | 1.140 |
| 2 | 117.0 | 1.040 |
| 3 | 93.0 | 0.995 |
| 4 | 78.0 | 0.965 |
| 5 | 56.1 | 0.887 |
| 6 | 38.0 | 0.820 |
| 7 | 26.0 | 0.765 |
| 8 | 18.0 | 0.715 |
| 9 | 11.2 | 0.615 |

Fig. 6

$$y = c \cdot x^d \quad \text{(IV)} \qquad \ln y = \ln c + d \cdot \ln x \quad \text{(IV')}$$

$$x = x_1 \rightarrow y = y_1 \quad \text{(V)}$$

$$x = x_2 \rightarrow y = y_2 \quad \text{(VI)}$$

$$d = (\ln y_2 - \ln y_1) \cdot (\ln x_2 - \ln x_1)^{-1} \quad \text{(VII)}$$

$$c = y_1 \cdot x_1^{-d} \quad \text{(VIII)}$$

Fig. 7

$$x = x_0 \rightarrow y_0 = c \cdot x_0^d \quad \text{(IX)}$$

$$c' = c_j / d' = d_j ; \quad y' = c' \cdot x_0^{d'} \quad \text{(X')}$$

$$(y' - y_0) = \min, \; > 0 \quad \text{(X'')}$$

METHOD FOR OPERATING A FUEL CELL BATTERY

The invention relates to a method for operating a fuel cell battery, in particular a battery of high temperature fuel cells. It also relates to a plant with a fuel cell battery.

High temperature fuel cell batteries, for example of the SOFC type ("Solid Oxide Fuel Cell") enable a utilization of the energy which is converted by the fuel cells in the operation of a building infrastructure (energy supply, heating and/or air conditioning). In this, the energy is used in two forms, namely as electrical energy which is produced as a result of electrochemical processes and as thermal energy of the hot exhaust gases which arise in the processes. The operation of a building infrastructure is relatively complex and therefore makes an energy management essential. Part of an energy management of this kind is a control of the system which is formed by the battery and by auxiliary installations which are required for its operation. This system control, which represents a management of the fuel cell battery, will be designated in brief as "stack management" in the following. The operating point at which the battery should be operated is defined by the stack management. The suitable operating point, which can be characterized by a maximum permissible current strength or a minimum voltage respectively, depends on different parameters: on the mass flow of the fuel, on the mass flow of the air, on the temperature of the electrochemical processes and on the qualitative state of the fuel cells, the so-called "integrity state".

The fuel cell battery can be characterized by an electromotive force (or "open circuit voltage" OCV) and an internal resistance $R_i$. $R_i$ depends on the quality of the battery, i.e. on its integrity state. A new battery which is capable of functioning has a good integrity state. Degradations of the electrochemically active components result from the operation of the battery, which results in a worsening of the integrity state as a result. In addition to the degradation the integrity state also depends on further defects of the battery. Defects of this kind are: cracks in electrolyte plates, faulty electrical contacts, coating faults, material faults and/or leakages.

The object of the invention is to create a method for the reliable operation of a fuel cell battery. The method should permit the setting of a correct loading of the battery, with it being desirable for the method to take into account that the integrity state of the battery worsens in the course of time. An operating point which is dependent on the integrity state must be determined with the method at which a permissible maximum current is not exceeded or a minimum voltage is not dropped below respectively. This object is satisfied by the method which is defined in claim 1.

The method for operating a fuel cell battery comprises an analysis of an integrity state of the battery. This integrity state is determined by means of measurement of operating parameters and a programmed evaluation of the measurement data. The battery is controlled for the purpose of reliable operation in such a manner that the maximum electrical output power is subjected to a limitation which is dependent on the integrity state or such that an interruption of the operation is initiated. The integrity state can be characterized by at least two parameters, in particular a parameter pair $c_j$, $d_j$. From a relationship which contains the parameters an internal electrical resistance $R_i$ of the battery can be calculated on the one hand and a statement on the quality of the battery can be derived on the other hand.

The subject of the subordinate claim 2 is a method which relates to the monitoring of an afterburning for the purpose of a reliable operation. The subordinate claims 3 to 9 relate to advantageous embodiments of the method in accordance with the invention. Claim 10 relates to a plant with a fuel cell battery.

Figure 2:
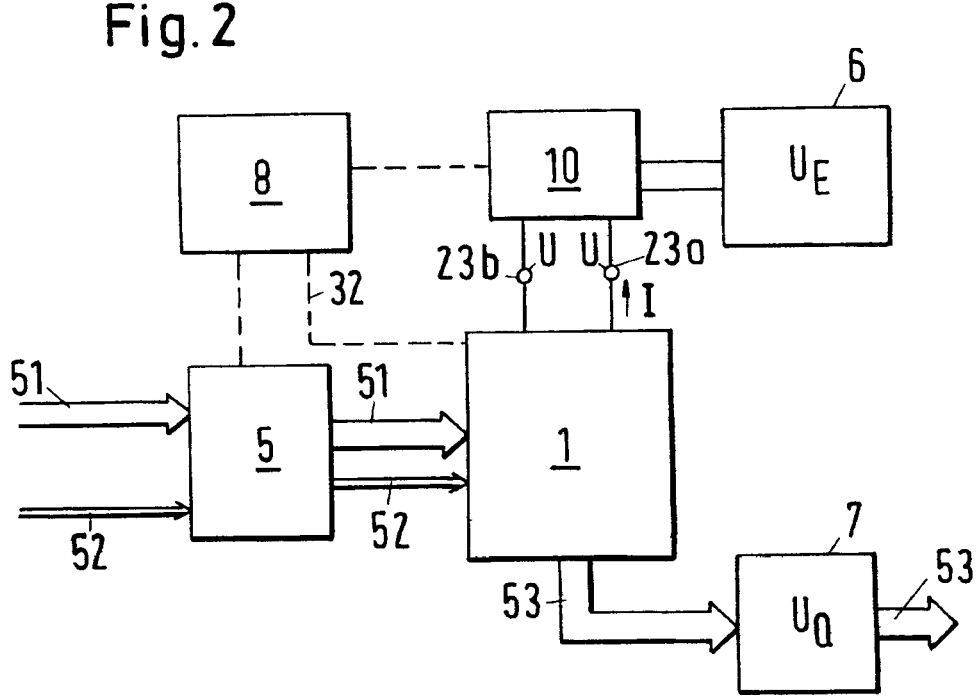
Figures 3, 5:
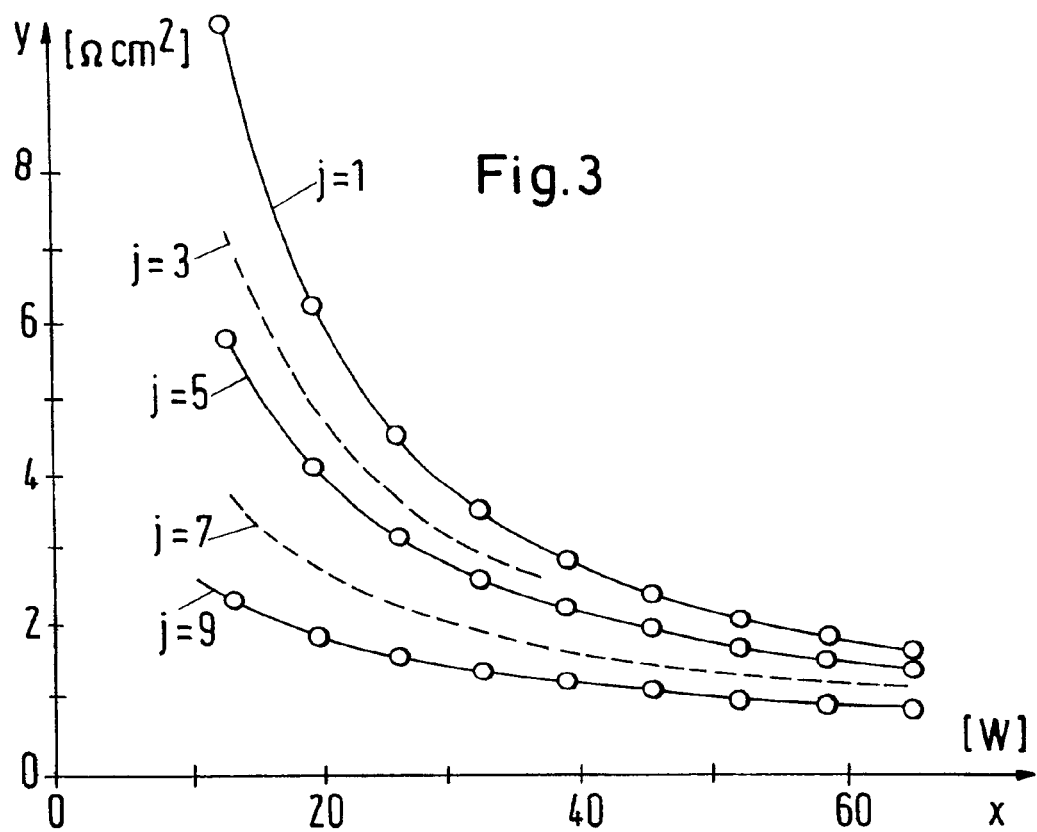

The invention will be explained in the following with reference to drawings and relationships which are collected together in the figures. Shown are:

FIG. 1 a battery with fuel cells which are arranged in the manner of a stack,

FIG. 2 a block diagram of a plant with a battery in accordance with FIG. 1,

FIG. 3 relationships between the internal resistance of the battery and the amount of fuel which is fed into the battery, FIG. 4 measurement curves pertaining to the relationships of FIG. 3, FIG. 5 a table with values of a parameter pair which is associated with the curves of FIG. 4, FIG. 6 relationships for determining the named parameter pair and FIG. 7 relationships for a determination of the integrity state.

The fuel cell battery 1 of FIG. 1 comprises a cell stack 2 (so-called "stack") with n cells z=1, 2, ... n. The stack 2 is encased in a sleeve 3 which forms a thermal insulation. A pre-reformer 4 in which a gas 52 which serves as a fuel is converted into a form which is suitable for the electrochemical processes is arranged beneath the stack 2. Oxygen which is contained in air 51 which is fed in forms a further educt of the processes. In the rectangle which is illustrated in chain-dotted lines an electrical substitute circuit 20 for the stack 2 is indicated, which comprises an electromotive force 21 (=OCV=$V_0$), an internal resistance 22 (=$R_i$) and electrical poles 23a, 23b. A direct electrical current I which is produced by the battery and a voltage U which is present between the poles 23a, 23b depend on an applied load. An increase in the load leads to an increase in U and at the same time to a reduction of I; the converse holds for a lowering of the load. The value $R_i$ of the internal resistance 22 can be calculated as a difference quotient in accordance with the relationship (I) in FIG. 1 from a voltage difference and a current strength difference, with it being possible to determine these differences by means of measurements of U and I respectively, before and after a small load change.

The sleeve 3 comprises a chamber 30 in which the reaction gases 51 and 52 are afterburned after passage through the fuel cells. At least one sensor 31 by means of which the presence of a flame can be monitored is arranged in this afterburner chamber 30. The sensor 31 is connected via a line 32 to a control device 8 (FIG. 2).

The plant which is indicated in FIG. 2 comprises in addition to the battery 1 a pneumatic regulator 5 (a so-called gas multiblock) for the air 51 and the gas 52. The energies which are produced in the battery 1 are supplied to electricity consumers 6 ($U_E$) and heat consumers 7 ($U_Q$). The control device 8 is used for carrying out the method in accordance with the invention. It is connected to the regulator 5, the battery 1 and an adaptation device 10. In the adaptation device 10 the electrical energy which is produced by the battery 1 is converted into a form which can be used by the consumer 6. This device 10 can comprise the following: an inverter in which direct current is converted into alternating current, connectors to an electrical battery and measurement devices (not shown). A measurement of $R_i$ can be carried out using the devices 8 and 10.

The variables x and y which are indicated in FIGS. 3 and 4 have the following significance: x is the fuel enthalpy $Q_F/n$ which is fed in per cell ($Q_F$=calorific value times fuel amount), see relationship (III'); y is the internal resistance existing per cell $R_i/n$ which is multiplied by an active electrode area $A_E$ of the cell. The internal resistance $R_i$ is proportional to the number n of cells due to the series connection of the cells and is inversely proportional to $A_E$ due to the parallel connection of the active surface elements of the cells: cf. relationship (III"). The proportionality factor y is independent of n and $A_E$. For y the designation ASR ("area specific resistance") is also used.

The x-y diagram of FIG. 4 shows a series of measurement curves for a collective of fuel cell batteries which has a broad spectrum of different integrity states, with integrity states j=1, 3, 5, 7 and 9 being associated with the curves which are included in the diagram. The curves can be expressed by a formula through a relationship (II) in accordance with FIG. 4. A parameter pair $c_j$, $d_j$ through which the integrity state j can be characterized enters into this relationship. The values of $c_j$ are positive, those of $d_j$ negative. Values for the parameter pairs $c_j$, $d_j$ for nine integrity states j=1, . . . 9 are collected in the table of FIG. 5. The greater the index j is, the better is the quality of the battery 1.

Diagnostics measurements are periodically carried out during the operation of the battery 1. Current values of a parameter pair c, d—see relationship (IV)—are determined using the relationships (IV) to (VIII) which are collected in FIG. 6. A parameter pair $c_j$, $d_j$ of the table in FIG. 5 can be associated with this pair c, d, which has been determined by the diagnostics measurement. A definition of this association is summarized in the relationships (IX) and (X').

The measurements and calculations which are to be carried out for the stack management will be discussed in the following in somewhat more detail in sections a) to c):

a) Through measurements of $R_i$ for batteries with different integrity states and using $Q_F$ as variables one arrives at a relation between x and y, which can be approximately represented by the relationship (II), FIG. 4, and into which the two parameters $c=c_j$ and $d=d_j$ enter. The establishing of y(x) will be described in the following section b). When a value of x is given, an internal resistance $R_i$ for the parameter pair $c_j$, $d_j$ can be calculated on the one hand; on the other hand an integrity state j of the battery is characterized by the parameter pair $c_j$, $d_j$. A series of curves, which is partly plotted in FIG. 3, corresponds to the different integrity states j. Values for the parameter pair $c_j$, $d_j$ are collected in the table of FIG. 5.

b) To establish y(x) through measurements at the collective of batteries, the integrity states j of which are different, one proceeds as follows:

b1) An x is set, with 10 W<x<70 W; U=V1 is likewise set. I is measured and the value I=I1 is obtained;

b2) x is left unchanged; U=V2 is set. I is measured: I=I2 b3) An association x→y(x) is determined through calculation of the following relationship:

$y(x)=-(v1-v2)/(i1-i2)$, with $v1=V1/n$, $v2=V2/n$, $i1=I1/A_E$ and $i2=I2/A_E$.

The series of curves in FIG. 3 was determined in accordance with the steps b1) to b3): in this the number n of cells amounted to 50; the values V1=37.5 V and V2=35 V were set for the voltage U.

c) The establishing of the parameter pair c, d takes place through measurements at a battery and the defining of a "conservative" parameter pair $c_j$, $d_j$ by means of the following procedure (cf. relationships (V) to (VIII) and relationships (IX) to (X") in FIGS. 6 and 7 respectively):

c1) The above listed steps b1) to b3) are carried out, and indeed for $x=x_1$ (32.5 W). One obtains $y(x_1)=y_1$: see relationship (V).

c2) Steps b1) to b3) are carried out for $x=x_2$ (45 W). The result is $y(x_2)=y_2$: see relationship (VI).

c3) d and c are calculated according to the relationships (VII) and (VIII).

c4) For the obtained values c and d, in addition with $x=x_0$ (30 W) and the relationship (IX), $y=y_0$ can now be calculated. $x_0$ is an average value for the amount of fuel which is supplied to a cell per second.

c5) The parameters $c_j$, $d_j$ are now defined for $x=x_0$ (30 W) by means of the relationships (IX), (X'), (X"). In this a value pair c', d' is sought in the table of FIG. 5 for which a y' which is calculated with the relationship (X') forms the smallest positive difference from $y_0$.

In the event that the relationship (X") can not be fulfilled, i.e. when there is no value pair $c_j$, $d_j$ for which the minimum of the relationship (X") is greater than zero, then the integrity state of the battery is insufficient. Thus at the same time a test of the battery is also given through the relationship (X") on the basis of which it can be decided whether the operation should be continued. The stack management should therefore display the message "replace stack".

The integrity state of the battery can be characterized by the parameter pair c, d in accordance with step c3). To each state there corresponds a voltage U or current strength I respectively which is ideal for the operation. In this the following relationships apply $I=(V_0-U)/R_i$ with $V_0=n$ 0.87 V(OCV), if the air surplus is sufficient (air index λ>1.5).

The voltage of an ideal operation is greater than the voltage 0.5 $V_0$, at which a maximum power output would be possible, since at the maximum power output, which is connected with a maximum current strength, a large degradation of the cell results as a result of intensive electrode reactions. For operating states of the batteries which have been used in the above named measurements and which can be regarded as ideal in regard to the cell degradation and the power drawn, the following voltages U are to be permitted:

for x=52 W (i.e. high power): U/n =0.55 V for x=13 W (i.e. low power): U/n=0.6 V for 13 W<x<52 W: linearly interpolated value for U/n.

The integrity state of the battery should be periodically determined, with an integrity state j being selected with values of the parameter pair $c_j$, $d_j$ (FIG. 5) which are stored in the control program. With respect to this integrity state j the control is defined anew: see section c). It is possible for the message "change stack" to result; nevertheless the operation should be continued during a predetermined interval (with j=1).

The quantitative data, for example the values for the parameter pair $c_j$, $d_j$, which have been given in the description of the method in accordance with the invention, depend on the fuel cells. With a different choice of fuel cells there result different quantitative relationships. The disclosed figures are thus merely to be considered as an example.

There are other procedures of how the integrity state can be assessed and the system control of the stack management can be set. In an alternative procedure of this kind the efficiency of the fuel cell battery or battery ($=R_iI^2/Q_F$) takes the place of y. For this efficiency a relationship corresponding to the relationship (II) can be determined, to which a different parameter pair is associated. In the efficiency there is the criterion that the latter must not exceed a value (="permissible efficiency") which is dependent on the integrity state. The system control must be designed such that this criterion is either fulfilled or the operation is interrupted.

For a reliable functioning of the fuel cell battery a monitoring of an afterburning is also important. The battery 1 comprises the chamber 30, in which the reaction gases 51, 52 are subjected to afterburning after passage through the fuel cells. A sensor 31 which is arranged in this chamber 30 is used in order to monitor the presence of a flame. A measurement signal arises in the presence of the flame. The measurement signal is produced in the sensor as a result of physical properties of the flame, in particular of a production of heat at the flame temperature or an emission of photons.

The monitoring of the temperature in the afterburner chamber 30 can be carried out with a thermo-generator 31. The thermo-generator 31 is a thermo-element, the signal produced by which is transmitted via a connection 32 to the control device 8 and is electronically evaluated there. Or the thermo-generator 31 is a series circuit with a large number of thermo-elements which produce a sufficiently high electrical power in order for example to be able to actuate a valve or a relay. The absence of this electrical power can lead to an initiation of an interruption of the operation and/or to an intrinsically safe monitoring of the sensor.

UV-photons are emitted in the combustion of hydrogen. The monitoring of the afterburning can therefore also be carried out by means of a UV probe 31. There are further possibilities for carrying out the combustion monitoring: With a CO sensor in the exhaust gas flow, which permits a conclusion to be drawn on the presence of a combustion in dependence on the measured CO concentration. Or a sensor in the afterburner chamber 30, by means of which the ionization in the combustion gases can be measured as in standard procedures for burners.

What is claimed is:

1. A method for operating a solid oxide fuel cell battery, in which an integrity state of the battery is determined by means of measurement of operating parameters and programmed evaluation of the measurement data and the battery is controlled for the purpose of reliable operation in such a maimer that the maximum electrical output power is subjected to a limitation which is dependent on the integrity state or an interruption of the operation is initiated, with the integrity state being characterizable by at least two parameters $c_j$, $d_j$, so that from a relationship which contains the parameters an internal electrical resistance ($R_i$) of the battery can be calculated and a statement on the quality of the battery can be derived wherein the battery comprises a chamber in which reaction eases are burned after passage through the fuel cells; and wherein at least one sensor is used in this chamber in order to monitor the presence of a flame, with a measurement signal being produced in the sensor as a result of physical properties of the flame.

2. A method in accordance with claim 1, wherein the physical properties of the flame are a production of heat at the flame temperature or an emission of photons.

3. A method in accordance with claim 1, wherein a mathematical relationship (II) exists between the internal resistance (Ri) and an amount of fuel (QF) which is fed into the battery; and wherein the parameters cj, dj enter into this relationship as proportionality factor or as exponent, respectively.

4. A method in accordance with claim 1, wherein current values of the parameter pair $c_j$, $d_j$ are determined by means of periodically carried out diagnostic measurements and by carrying out digital computations (IV–X"); and wherein as a result of these values the control of the battery is adapted where appropriate.

5. A method in accordance with claim 4, wherein a table of values of the parameter pair $c_j$, $d_j$ is determined on the basis of a collective of batteries having a broad spectrum of different integrity states (j); and wherein these values are used in the control instead of the values which are determined by the diagnostic measurements, with a minimum deviation of the results of the diagnostic measurement being aimed for by means of a predetermined criterion (IX–X").

6. A method in accordance with claim 5, wherein a request for the interruption of the operation is indicated by the system control in the event that the minimum deviation in accordance with the predetermined criterion (IX–X") does not exist.

7. A method in accordance with claim 2, wherein the monitoring of the afterburning is carried out by means of a thermo-generator.

8. A method in accordance with claim 2, wherein the monitoring of the afterburning is carried out by means of a UV probe or an ionization measurement.

9. A method in accordance with claim 2, wherein the monitoring of the afterburning is carried out by means of a CO sensor which is arranged in the exhaust gas flow.

10. A method in accordance with claim 4 wherein depending upon the integrity state, a message is displayed that a replacement of the fuel cells is required.

* * * * *